L. TUFTS.
SMOKER'S PIPE.
APPLICATION FILED SEPT. 21, 1911.
1,065,008. Patented June 17, 1913.
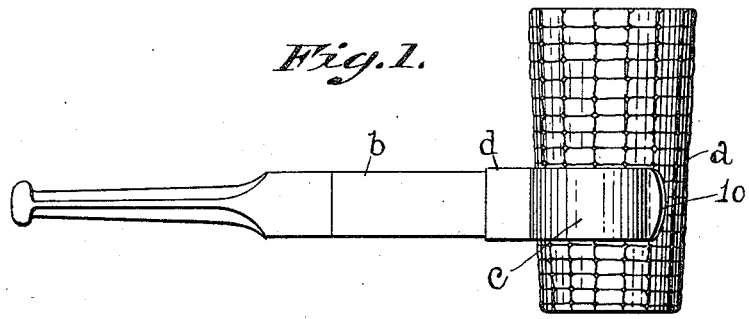
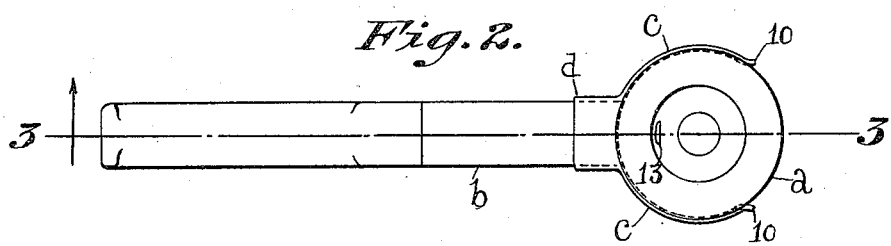
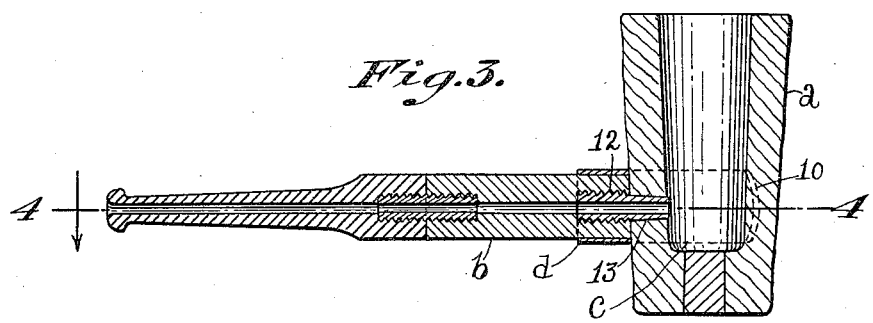
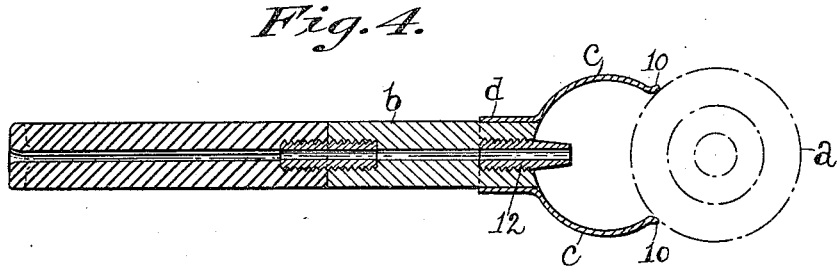
WITNESSES:
M. S. Crozier
J. Murphy
INVENTOR.
Leonard Tufts
BY
Jas. H. Churchill
ATTORNEY.

UNITED STATES PATENT OFFICE.

LEONARD TUFTS, OF CENTER HARBOR, NEW HAMPSHIRE.

SMOKER'S PIPE.

1,065,008.  Specification of Letters Patent.  Patented June 17, 1913.

Application filed September 21, 1911. Serial No. 650,537.

*To all whom it may concern:*

Be it known that I, LEONARD TUFTS, a citizen of the United States, residing in Center Harbor, county of Belknap, and State of New Hampshire, have invented an Improvement in Smokers' Pipes, of which the following description, in connection with the accompanying drawings, is a specification, like letters on the drawings representing like parts.

This invention relates to a smoker's pipe and has for its object to provide a pipe in which the bowl is detachable from the stem, so as to enable the bowl when saturated with nicotin and too strong to be used with pleasure, to be thrown away and a new bowl used with the stem.

The bowl of the pipe may and preferably will be made of corn cob or other suitable material, which is sweet and pleasant when first used, and which can be replaced at a minimum expense by a new bowl when it becomes strong. The stem is designed to be used permanently and can be made of more or less expensive material and given any desired ornamental appearance.

Figure 1 is a side elevation of a pipe embodying this invention. Fig. 2, a plan view of the pipe shown in Fig. 1. Fig. 3, a vertical longitudinal section on the line 3—3, Fig. 2, and Fig. 4, a horizontal longitudinal section on the line 4—4, Fig. 3.

Referring to the drawing, $a$ represents the bowl and $b$ the stem of a pipe embodying this invention. The bowl $a$ may be of any suitable material, but preferably corn cob, which is pleasing in taste to the smoker when used for a moderate length of time, but which becomes obnoxious after it becomes saturated with nicotin.

The stem $b$ may be of any desired material, and owing to the fact that it is designed to be used with a plurality of bowls, it may be made of expensive material and provided with any desired amount of ornamentation, such as silver, nickel, or gold trimmings, as the stem may be regarded as a permanent structure, which is to remain in the possession of the smoker. The stem $b$ is detachable from the bowl so that the latter can be thrown away when it becomes too strong, and said stem is provided with means for detachably securing it to the bowl. In the present instance, the stem has secured to it a pair of clamping arms $c$, which are attached to a collar $d$ fitted over the end of the stem and frictionally or otherwise secured thereto.

The arms $c$ and collar $d$ may be of metal, either solid or plated, and the said arms may be provided at their free ends with outwardly extended or bent fingers 10 to facilitate entrance of the bowl between the arms.

The pipe stem may be connected with the interior of the bowl $a$ by a nipple 12, which may be screw-threaded at one end to engage the stem and have its other end tapered to enter a tapered socket or hole 13 in the bowl. The nipple 12 projects beyond the end of the stem a distance substantially equal to the thickness of the walls of the bowl and is blunt at its inner end, so that, when fitted to the bowl, the latter may be left smooth on the interior and of its full holding capacity and free from sharp projections within the bowl.

From the above description, it will be seen that the bowl is detachably connected with the stem, so that when the bowl becomes strong and more or less offensive, the stem can be readily detached from it by holding the bowl in one hand and pulling on the stem with the other, until the clamping arms are disengaged from the bowl as represented in Fig. 4. A new bowl can be fitted to the stem, by holding the bowl with one hand and pushing the stem toward the bowl until the nipple 12 enters the socket 13 in the bowl, at which time the bowl will be firmly grasped by the clamping arms. It will thus be seen that the stem can be used with a large number of bowls and that the latter can be made of corn cob or other inexpensive material or if desired with expensive material, as the stem, if it grows strong can be readily cleaned and used with a new bowl.

I have herein shown one form of means for clamping or detachably connecting the stem with the bowl, but I do not desire to limit the invention to the particular means herein shown.

A pipe of the character described having a corn cob or other inexpensive bowl can be made neat and attractive in appearance by the character and design of the stem, which by reason of its being practically permanently in use can be made of any elaborate design or given any degree of ornamentation desired.

Claim.

In a smoker's pipe, in combination, a bowl having a smoke outlet opening, a stem, a collar mounted on said stem at one end and having clamping arms extended from it to engage the bowl and detachably secure said stem to said bowl, said collar being removable from the bowl with said stem, and a nipple coöperating with said stem and bowl and projecting beyond said stem a distance substantially equal to the length of the smoke outlet opening and having its inner end substantially flush with the inner surface of the bowl, substantially as described.

In testimony whereof, I have signed my name to this specification in the presence of two subscribing witnesses.

LEONARD TUFTS.

Witnesses:
JAS. H. CHURCHILL,
J. MURPHY.

Copies of this patent may be obtained for five cents each, by addressing the "Commissioner of Patents, Washington, D. C."